Patented Oct. 9, 1951

2,570,882

UNITED STATES PATENT OFFICE 2,570,882

PREPARATION OF A SINTERED COBALT OXIDE PELLETED CATALYST

Alvin B. Stiles, Charleston, W. Va., assignor to E. I. du Pont de Nemours & Company, Wilmington, Del., a corporation of Delaware No Drawing. Application March 27, 1948, Serial No. 17,577. In Great Britain June 12, 1946

1 Claim. (Cl. 23—183)

This invention relates to methods of preparing catalysts and more particularly to the preparation of a strengthened pelleted cobalt catalyst which is formed by compacting, pelleting, and sintering cobalt oxide. This application is a continuation-in-part of my application S. N. 633,851, filed December 8, 1945, now abandoned.

Large scale production of metal oxide pelleted catalysts presents difficulties for the catalytically active material of which the catalyst is made and many of the materials with which the catalyst is associated are quite abrasive. Consequently the ordinary type of pelleting machines can be used only if a suitable material is added to the catalyst which provides lubrication during the pelleting operation. It is obvious that the lubricant must be selected with care for many lubricants would destroy the catalytic character of the pelleted product, result in the formation of undesirable by-products during the reaction or produce a pellet having unsatisfactory physical and chemical characteristics.

An object of the present invention is to provide a process for the preparation of pellets of catalytic material. Another object is to provide a process for producing pellets of exceptional strength and durability which contain no foreign contaminating ingredients. A further object of the invention is to provide a cobalt catalyst having new and improved physical characteristics and long life adapted for organic hydrogenation, dehydrogenation or oxidation reactions generally. Yet another object is to provide a process wherein a metal oxide is mixed with a lubricant, pelleted and the metal oxide sintered under such conditions that the lubricant is substantially completely driven from the pelleted catalyst whereby the pelleted catalyst is greatly increased in strength. Other objects and advantages of the invention will hereinafter appear.

The above and other objects are attained by preparing a catalyst in which there is incorporated a pelleting agent that not only lubricates the catalyst granules during the pelleting operation but also can be thoroughly removed during a subsequent sintering operation to give a catalyst of superior physical characteristics and physico-chemical activity. In its broader aspects the invention involves mixing with a metal oxide, to be used as the catalyst, from 1 to 5% of a pelleting agent. These agents are solids at normal temperatures which melt below sintering temperature, causing the pelleted granules of catalyst during sintering to occupy a smaller space than the unsintered catalyst. The agents likewise are substantially completely vaporizable at the temperature of sintering and leave practically no ash after sintering. Especially effective agents are the animal and vegetable stearins and normally higher fatty acids such, for example, as those acids containing more than 12 carbon atoms and including tridecylic, myristic, pentadecylic and more particularly palmitic and stearic acids or esters thereof. The esters are preferably those which are solids at room temperature but are fluid at temperatures below the sintering temperature of the metal oxide and as examples of such esters are more particularly the glycolic, glyceryl, and similar polyhydric alcohol esters of the acids (such as glyceryl tristearate and glyceryl tripalmitate) whether of the mono or polycarboxylate types, although the simple esters such as methyl, ethyl, propyl, and higher monohydric alcohol esters may be used if desired with not, however, as outstanding results.

Metal oxide catalysts generally can be prepared by the process of this invention and more particularly the cobalt oxide catalysts which are highly active for catalyzing organic synthesis reactions generally. These catalysts are formed, for example, from the pure oxide of the metal which may be derived by precipitation of the carbonate of the metal, from a nitrate solution thereof with ammonia and carbon dioxide or with ammonium carbonate. The precipitated carbonate of the metal may then be decomposed to the oxide by roasting in air at a temperature between 300 and 500° C. In general, the lowest possible roasting temperature should be used to obtain most satisfactory sintering. The resulting oxide, in the presence or absence of the metal, is then kneaded in a suitable kneading machine, in order to improve its density characteristics, and the thus kneaded oxide combined with from 1 to 5%, preferably in the order of 2 to 4%, of the lubricant and sintering aid as defined above. The sintering aid is thoroughly distributed throughout the catalyst mixture. The resulting mixture may then be pilled in a suitable pilling machine such, for example, as a Stokes rotary machine and it will be found that with these lubricants the pills can be easily and automatically discharged from the machine even though a very coarse, sharp grain metal oxide is compressed in the pills. The pill is then sintered in a furnace and in an oxidizing atmosphere to a temperature between 500° and 1100° C., and especially 700° to 1100°. The sintering may take, for cylindrical pills having a diameter of about 0.25 inch and a height of about 0.25 inch, from 2 to 4 hours. After the sintering operation, the pills are gradually cooled to room temperature requiring for this cooling or annealing operation about 8 hours. The finished pills produced in accord with this process have been shrunk by the sintering treatment to approximately 60% from their pilled size, have become very hard, are porous, and may consequently be used under the most rigorous conditions of organic catalytic reactions and when so used are durable and have a long, active catalytic life.

In order to manufacture cobalt oxide catalysts of maximum strength and catalytic activity the cobalt oxide to be pelleted and sintered must be carefully selected. The oxide should be preferably be lower than cobaltic ($Co_2O_3$) or corbaltosic ($Co_3O_4$) and preferably should exist as cobaltous (CoO). When heated in air finely divided cobalt normally goes through the following oxidation changes:

Below 900° C., $Co_2O_3$ is the stable form of oxide.
Above 900° C., $Co_2O_3$ decomposes to $Co_3O_4$ until at 1900° C. $Co_3O_4$ is completely decomposed and only CoO remains.

Nickel oxide also sinters best as the nickelous oxide (NiO) but nickel oxide differs sharply from cobalt oxide in stability at various temperatures. When heated in air finely divided nickel normally goes through the following oxidation changes:

Below 400° C., nickel can exist as either $Ni_2O_3$ or NiO.
Between 400° C. and 600° C., $Ni_2O_3$ predominates.
At 600° C., $Ni_2O_3$ decomposes to form NiO.

If nickel oxide is pelleted with either graphite or organic lubricants, and then both types of pellets are heated in air to the sintering temperature of 800–1000° C., both types sinter almost equally well. The graphite pellets were only slightly harder as indicated by a strength comparison in which it was necessary to apply an average of 5000 p. s. i. to the graphite pellets and 4950 p. s. i. to the organic lubricated pellets before breakage of the pellets occurred. It should be noted that during the course of heating the pellets to sintering temperature, the nickel oxide underwent thermal decomposition without the aid of the reducing action of the lubricants, to nickelous oxide which sinters readily to form compact hard pellets.

If cobalt oxide is pelleted with either graphite or organic lubricants and then both types of pellets are heated in air to the sintering temperature of 800–1000° C., the graphite pellets will be weak and grainy, whereas the pellets made with organic lubricant will sinter satisfactorily to form hard pellets. A strength comparison between the pellet types indicated that the graphite pellets crushed under a pressure of 400 p. s. i. whereas it was necessary to apply 4200 p. s. i. to crush the pellets made with organic lubricant. Crushing strength of the pellets prior to sintering was about equal at 400 p. s. i. for both types of pellets. An explanation of the difference of sintering characteristics between the two types of pellets is that while heating the pellets to sintering temperature, the organic lubricant reduces the cobaltic oxide to the cobaltous stage which sinters readily. Graphite, apparently because of its poorer distribution through the pellet or because of its poor reducing characteristics does not effect the necessary reduction to the cobaltous oxide. It should be noted also that cobalt differs from nickel in that the higher oxides do not thermally decompose in the sintering temperature range to form the desired cobaltous oxide. That reduction of the cobaltic oxide is necessary is further indicated by tests in which cobaltic oxide pelleted with graphite was made to sinter satisfactorily by incipiently reducing the pelleted cobaltic oxide with hydrogen at 250° C. then immediately heating them in an air atmosphere to 950° C.

The examples illustrate preferred embodiments of the invention in which parts are by weight unless otherwise indicated.

*Example 1*—2070 grams of cobalt nitrate hexahydrate, $(Co(NO_3)_2.6H_2O)$, were dissolved in sufficient distilled water to give a total volume of 16 liters of solution. The solution was heated to 85° C. then sufficient powdered ammonium carbonate was added to effect maximum precipitation of the cobalt (about 835 grams were required) which was then in the form of basic cobalt carbonate. The precipitate was filtered and during filtration was washed with distilled water to remove soluble salts. The cobalt carbonate was then heated to 400° C. to effect both drying and decomposition of the carbonate. The resultant finely divided, and low apparent density cobalt oxide was kneaded with distilled water in a Readco kneader to obtain a dense paste. After drying, the dense oxide was pulverized to obtain a powder passing 100% through a U. S. standard 10-mesh screen. The powder was then weighed and a weight of powdered Sterotex equivalent to 3% of the weight of the cobalt oxide powder was thoroughly mixed with the oxide. (Sterotex is the trade name of a product of the Capitol City Products Company and is specified as vegetable stearin and passes 100% through a U. S. standard 100-mesh screen.) The mixture of cobalt oxide was then pelleted in a Stokes pelleting machine. The resultant pellets were placed in an electrically heated muffle furnace at 700° C. in such a way that air circulated freely over and through the pellets. The temperature was raised gradually to 900° C. and maintained thereat for 3 hours after which the temperature was permitted to decrease gradually to room temperature.

The force required to crush the pellets was increased by the sintering treatment, from an average of 410 pounds per sq. in. to an average of 4,200 pounds per sq. in. The volume of each pellet had decreased by approximately 40% during the sintering treatment. The catalyst, after reduction to the metal, was very active for hydrogenation reactions.

*Example 2*—Cobalt oxide prepared as outlined in Example 1 was divided into three portions, after kneading, drying, and pulverization. One, three, and five per cent graphite was mixed with the three separate portions of the powder. When attempts were made to pellet these powders at the normal speed of the pelleting machine, the pellets formed were weak due to lamination which in turn was due to the poor cohesive qualities of the cobalt oxide-graphite mixture. When such pellets were sintered, the pellets remained weak, fracturing easily along the planes of lamination.

The pelleting machine was then operated slowly to avoid the formation of laminated pellets. When these pellets were heated under sintering conditions, no decrease in volume was obtained and the force required to crush the heat treated pellets was only about 400 pounds per sq. in.

There are three likely explanations in addition to that given above for the efficacy of the organic lubricant in contrast to graphite, which explanations are offered only by way of illustration and in no way limit the scope of the invention.

Even though highly purified, commercial graphite contains a few tenths of a per cent ash. It is well known that when metallic mercury contains only a very small amount of impurity on the surface, individual droplets will only with great difficulty coalesce to form a single body. It is likely that the ash residue from the graphite similarly prevents the smaller particles of cobalt oxide from uniting to form a dense, closely-knit body.

How the use of the aforesaid sintering aids makes it possible to prepare from a metal oxide a sintered pellet having unexpected and unusual strength, is not fully understood. It may be, however, which theory also will not in any way limit the scope of the invention as claimed, that the melting of the sintering aid in the compressed pellet aids in compacting the pellet by a flow of the granules in effect toward the center of the pellet and that when the sintering aid has been wholly driven from the pellet the granules retain their shrunken, more compacted form which results in the improved resistance to compression and wear.

I claim:

In a process for the preparation of a sintered cobalt oxide pelleted catalyst in a state of oxidation lower than $Co_2O_3$ and having a crushing strength of about 4200 lbs./sq. in., the steps which comprise dissolving cobalt nitrate hexahydrate in water, precipitating basic cobalt carbonate from the solution by the addition of ammonium carbonate, filtering and washing the precipitate with distilled water to remove soluble salts, heating the cobalt carbonate precipitate to a temperature of about 400° C., kneading the resulting product with water to give a dense paste, drying the paste and pulverizing to give a powder, 100% of which passes through a 10 mesh U. S. standard screen, adding to the powder and thoroughly mixing it with 3% by weight of vegetable stearin, pelleting the mixture, heating the resulting pellets in the presence of air and at a temperature of about 700° C., gradually raising the temperature to 900° C. and sintering at that temperature for about 3 hours.

ALVIN B. STILES.

REFERENCES CITED

The following references are of record in the file of this patent:

UNITED STATES PATENTS

| Number | Name | Date |
| --- | --- | --- |
| 1,896,320 | Luft | Feb. 7, 1933 |
| 2,106,597 | Ferguson | Jan. 25, 1938 |
| 2,209,492 | Spicer | July 30, 1940 |
| 2,345,600 | Heard | Apr. 4, 1944 |

FOREIGN PATENTS

| Number | Country | Date |
| --- | --- | --- |
| 166,285 | Great Britain | July 7, 1921 |

Certificate of Correction

Patent No. 2,570,882                                                          October 9, 1951

ALVIN B. STILES

It is hereby certified that error appears in the printed specification of the above numbered patent requiring correction as follows:

Column 2, line 5, after "normally" insert *solid*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*